(12) United States Patent
Lee et al.

(10) Patent No.: US 9,874,956 B2
(45) Date of Patent: Jan. 23, 2018

(54) TOUCH PANEL AND THREE-DIMENSIONAL COVER PLATE THEREOF

(71) Applicant: TPK Touch Solutions (Xiamen) Inc., Xiamen (CN)

(72) Inventors: Yuh-Wen Lee, Hsinchu (TW); Hsiang-Lung Hsia, Changhua (TW); Quanfen Dai, Longyan (CN); Dongmei Ye, Xiamen (CN)

( * ) Notice: Subject to any disclaimer, the term of this patent is extended or adjusted under 35 U.S.C. 154(b) by 9 days.

(21) Appl. No.: 14/918,518

(22) Filed: Oct. 20, 2015

(65) Prior Publication Data

US 2016/0109974 A1 Apr. 21, 2016

(30) Foreign Application Priority Data

Oct. 21, 2014 (CN) .......................... 2014 1 0562042

(51) Int. Cl.
| | | |
|---|---|---|
| G06F 3/041 | (2006.01) | |
| G06F 3/044 | (2006.01) | |
| B32B 9/00 | (2006.01) | |
| B32B 9/04 | (2006.01) | |
| B32B 17/06 | (2006.01) | |

(52) U.S. Cl.
CPC .............. *G06F 3/041* (2013.01); *B32B 9/005* (2013.01); *B32B 9/04* (2013.01); *B32B 17/06* (2013.01); *G06F 3/044* (2013.01); *B32B 2307/412* (2013.01); *B32B 2457/208* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 8,500,292 | B2* | 8/2013 | Lo | G02F 1/133308 362/627 |
| 8,980,115 | B2* | 3/2015 | Bibl | B32B 3/02 216/23 |
| 2004/0041504 | A1* | 3/2004 | Ozolins | G02F 1/1333 313/110 |
| 2005/0162583 | A1* | 7/2005 | Ozolins | G02F 1/1333 349/58 |
| 2006/0257753 | A1* | 11/2006 | Kim | B82Y 10/00 430/5 |
| 2007/0115207 | A1* | 5/2007 | Jang | G02F 1/133308 345/32 |
| 2007/0115268 | A1* | 5/2007 | Jang | G02F 1/133308 345/183 |
| 2007/0115269 | A1* | 5/2007 | Jang | G02F 1/133308 345/183 |
| 2008/0074028 | A1* | 3/2008 | Ozolins | G02F 1/1333 313/479 |
| 2011/0039094 | A1* | 2/2011 | Sivasankar | C03C 27/10 428/332 |
| 2011/0075065 | A1* | 3/2011 | Ozolins | G02F 1/1333 349/58 |
| 2011/0235364 | A1* | 9/2011 | Lo | G02F 1/133308 362/611 |

(Continued)

*Primary Examiner* — Patrick F Marinelli

(57) ABSTRACT

A three-dimensional cover plate includes a transparent substrate, a side panel, and a first binding layer. The side panel is bonded to a part of the transparent substrate, and the first binding layer is disposed between the transparent substrate and the side panel to bond the transparent substrate and the side panel.

11 Claims, 5 Drawing Sheets

(56) References Cited

U.S. PATENT DOCUMENTS

| | | | | |
|---|---|---|---|---|
| 2011/0256385 A1* | 10/2011 | Matsuzaki | ............... | C03C 17/42 428/336 |
| 2012/0118628 A1* | 5/2012 | Pakula | ................. | G06F 1/1626 174/520 |
| 2012/0326576 A1* | 12/2012 | Ozolins | ................ | G02F 1/1333 312/7.2 |
| 2013/0071601 A1* | 3/2013 | Bibl | ......................... | B32B 3/02 428/67 |
| 2013/0163117 A1* | 6/2013 | Bhatia | ..................... | G11B 5/72 360/110 |
| 2013/0218513 A1* | 8/2013 | Hasson | .................. | B01L 7/525 702/133 |
| 2013/0278545 A1* | 10/2013 | Cok | ........................ | G06F 3/044 345/174 |
| 2014/0139978 A1* | 5/2014 | Kwong | ................. | H04M 1/0202 361/679.01 |
| 2014/0181750 A1* | 6/2014 | Fujiwara | ............ | G06F 3/04817 715/835 |
| 2014/0240620 A1* | 8/2014 | Chiu | .................... | G06F 1/1626 349/12 |
| 2014/0247543 A1* | 9/2014 | Ozolins | ................ | G02F 1/1333 361/679.01 |
| 2015/0070826 A1* | 3/2015 | Montevirgen | ........ | G06F 1/1637 361/679.26 |
| 2015/0085432 A1* | 3/2015 | Memering | ............ | G06F 1/1626 361/679.01 |
| 2015/0129401 A1* | 5/2015 | Sanford | ................ | G06F 1/1626 200/294 |
| 2015/0234430 A1* | 8/2015 | Gupta | ................... | G06F 1/1643 345/174 |
| 2015/0342066 A1* | 11/2015 | Motohashi | ........... | H05K 5/0217 361/679.01 |
| 2015/0362960 A1* | 12/2015 | Chang | ..................... | G06F 3/044 345/173 |
| 2016/0034078 A1* | 2/2016 | Ryu | ........................ | G06F 3/047 345/174 |
| 2016/0100255 A1* | 4/2016 | Kanemaki | ............. | H04R 17/00 381/190 |
| 2016/0109974 A1* | 4/2016 | Lee | .......................... | B32B 9/04 345/173 |
| 2016/0109982 A1* | 4/2016 | Lee | ......................... | G06F 3/041 345/173 |
| 2016/0126033 A1* | 5/2016 | Hibino | .................. | H01H 13/88 361/679.01 |
| 2016/0132142 A1* | 5/2016 | Chiu | .................... | G06F 1/1626 345/173 |
| 2016/0212872 A1* | 7/2016 | Pakula | .................. | G06F 1/1626 |
| 2016/0277057 A1* | 9/2016 | Takahashi | ............. | H01H 13/06 |

\* cited by examiner

TOUCH PANEL AND THREE-DIMENSIONAL COVER PLATE THEREOF

BACKGROUND OF THE INVENTION

This application claims priority to Chinese Application Serial Number 201410562042.4, filed Oct. 21, 2014, which is herein incorporated by reference.

FIELD OF THE INVENTION

The present disclosure relates to touch panels. More particularly, the present disclosure relates to touch panels and three-dimensional cover plates thereof.

DESCRIPTION OF RELATED ART

Touch panels are widely used in display screens of electronic products, such as cellular phones, cameras and tablets, to enhance convenience of control and signal input. For example, general smart phones and tablet computers include a touch panel, and users input signals through the touch panel directly, such as into a handwriting recognition system.

However, glass and sapphire are commonly used in these products to manufacture a cover plate of the planar touch panel, but there is no touch functionality at sides of the products. Generally, buttons or switches are disposed at the sides of the products for operation. Although current technology allows manufacture of three-dimensional glass cover plates by a heat bending process, dimensional accuracy of the three-dimensional glass cover plate is hard to control. In addition, particles that form pits remain on surfaces of the glass cover plate, and a subsequent process is necessary to polish the surfaces to achieve product specifications. The heat bending process further requires high temperature to manufacture the three-dimensional glass cover plate, which increases cost and risk in the manufacturing process.

SUMMARY OF THE INVENTION

The present disclosure provides a touch panel and a three-dimensional cover plate thereof. A binding layer is applied to achieve a composite of a transparent substrate and a side panel without using any adhesives.

The present disclosure provides a three-dimensional cover plate. The three-dimensional cover plate includes a transparent substrate, a side panel, and a first binding layer. The side panel is bonded to a part of the transparent substrate, and the first binding layer is disposed between the transparent substrate and the side panel to bond the transparent substrate and the side panel.

In one or some embodiments of the present disclosure, the first binding layer includes silicon-oxygen-silicon bonds, aluminum-oxygen-silicon bonds or aluminum-oxygen-aluminum bonds.

In one or some embodiments of the present disclosure, the transparent substrate and the side panel are independently formed of glass or sapphire.

In one or some embodiments of the present disclosure, the transparent substrate is a transparent composite substrate including a sapphire substrate, a glass substrate and a second binding layer. The glass substrate is disposed below the sapphire substrate, and the side panel is bonded to a part of the glass substrate. The second binding layer bonds the sapphire substrate and the glass substrate, and the second bonding layer includes aluminum-oxygen-silicon bonds.

In one or some embodiments of the present disclosure, an inorganic material layer is disposed between the first binding layer and the side panel, and the first binding layer includes silicon-oxygen-silicon bonds In one or some embodiments of the present disclosure, the inorganic material layer is a silicon layer or a silicon dioxide layer.

In one or some embodiments of the present disclosure, the inorganic material layer has a thickness equal to or greater than 1 μm.

In one or some embodiments of the present disclosure, the transparent substrate has a lower surface, and an upper surface of the side panel is bonded to a periphery of the lower surface of the transparent substrate.

In one or some embodiments of the present disclosure, the transparent substrate has a side surface adjacent to the lower surface, and the side panel has a side surface adjacent to the upper surface, which the side surface of the side panel is flush with the side surface of the transparent substrate.

In one or some embodiments of the present disclosure, the transparent substrate has a side surface, and a side surface of the side panel is bonded to the side surface of the transparent substrate.

In one or some embodiments of the present disclosure, the transparent substrate has an upper surface adjacent to the side surface, and an upper surface of the side panel is flush with the upper surface of the transparent substrate.

The present disclosure provides a touch panel. The touch panel includes a three-dimensional cover plate and a touch sensing device. The three-dimensional cover plate acts as a cover plate of the touch panel, which the three-dimensional cover plate includes a transparent substrate, a side panel, and a first binding layer. The side panel is bonded to a part of the transparent substrate, and the first binding layer is disposed between the transparent substrate and the side panel to bond the transparent substrate and the side panel. The touch sensing device is disposed below an lower surface of the transparent substrate.

In one or some embodiments of the present disclosure, the touch sensing device is a touch sensing film adhered to the lower surface of the transparent substrate.

In one or some embodiments of the present disclosure, the touch sensing device includes a sensing electrode layer and a wire layer. The sensing electrode layer is disposed at the lower surface of the transparent substrate, and the wire layer is disposed at a side surface of the side panel adjacent to the lower surface of the transparent substrate, and the wire layer is electrically connected to the sensing electrode layer.

In one or more embodiments of the present disclosure, a plurality of touch functional devices are disposed at the side surface of the side panel.

BRIEF DESCRIPTION OF THE DRAWINGS

The invention can be more fully understood by reading the following detailed description of the embodiment, with reference made to the accompanying drawings as follows.

DETAILED DESCRIPTION OF THE INVENTION

Figure 1:
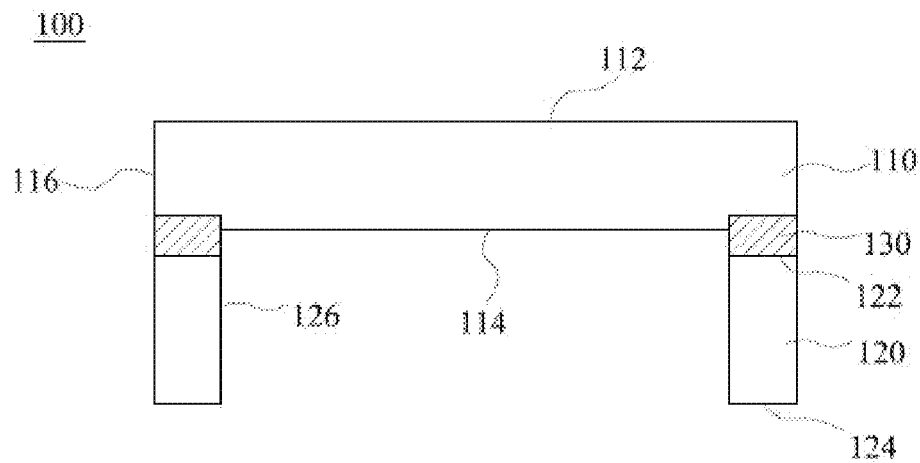
FIG. 1 illustrates a cross-sectional view of a three-dimensional cover plate according to various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a cross-sectional view of a three-dimensional cover plate 100 according to various embodiments of the present disclosure. As shown in FIG. 1, the three-dimensional cover plate 100 includes a transparent substrate 110 and a side panel 120. The side panel 120 is bonded to a part of the transparent substrate 110, and a binding layer 130 is disposed between the transparent substrate 110 and the side panel 120 to bond the transparent substrate 110 and the side panel 120. Bonding can indicate that a bond is formed between the transparent substrate 110 and the side panel 120, so as to achieve a stable and strong composite of the transparent substrate 110 and the side panel 120. In some embodiments, the three-dimensional cover plate 100 includes one side panel 120, and this side panel 120 is disposed at one edge of a lower surface 114 of the transparent substrate 110. In various embodiments, the three-dimensional cover plate 100 includes a plurality of side panels 120, and these side panels 120 are disposed at edges of the lower surface 114 and surround a periphery of the lower surface 114.

Specifically, the transparent substrate 110 includes an upper surface 112 and a lower surface 114, and the side panel 120 also includes an upper surface 122 and a lower surface 124. The transparent substrate 110 and the side panel 120 are transparent planar plate, such as glass or sapphire. The glass is preferably selected from glass for touching (float glass) or aluminate glass.

During the bonding process, a surface treatment is performed on the surfaces predetermined for bonding. In some embodiments, the surface treatment is performed on the upper surface 122 of the side panel 120 and the lower surface 114 of the transparent substrate 110, to make the upper surface 122 and the lower surface 114 hydrophilic and have valence bonds. After the surface treatment, the hydrophilic upper surface 122 of the side panel 120 and the hydrophilic lower surface 114 of the transparent substrate 110 adsorb hydroxyl groups, which react with silicon in the glass to form silanol bonds (Si—OH). Similarly, the hydroxyl groups also react with aluminum in the sapphire to form aluminum alcohol bonds (Al—OH).

The upper surface 122 of the side panel 120 and the lower surface 114 of the transparent substrate 110 are overlapped to form a contact surface therebetween. Then, an annealing process is performed on the side panel 120 and the transparent substrate 110 to polymerize silanol bonds and aluminium alcohol bonds at high temperature, and the binding layer 130 is formed with aluminum-oxygen-silicon bonds (Al—O—Si), silicon-oxygen-silicon bonds (Si—O—Si), or aluminum-oxygen-aluminum bonds (Al—O—Al) therein to achieve a stable composite of the side panel 120 and the transparent substrate 110. A thickness of the binding layer 130 is very thin, which is less than or equal to about 10 nm.

In some embodiments, the upper surface 122 of side panel 120 is bonded to a periphery of the lower surface 114 of the transparent substrate 110. Furthermore, the transparent substrate 110 has a side surface 116 adjacent to the lower surface 114 and the upper surface 112, and the side panel 120 has a side surface 126 adjacent to the upper surface 122 and lower surface 124. The side surface 126 of the side panel 120 is flush with the side surface 116 of the transparent substrate 110, and the three-dimensional cover plate 100 with integrated seamless connection is formed.

In some embodiments, the transparent substrate has a thickness in a range from about 0.3 mm to about 2.0 mm.

Figure 2:
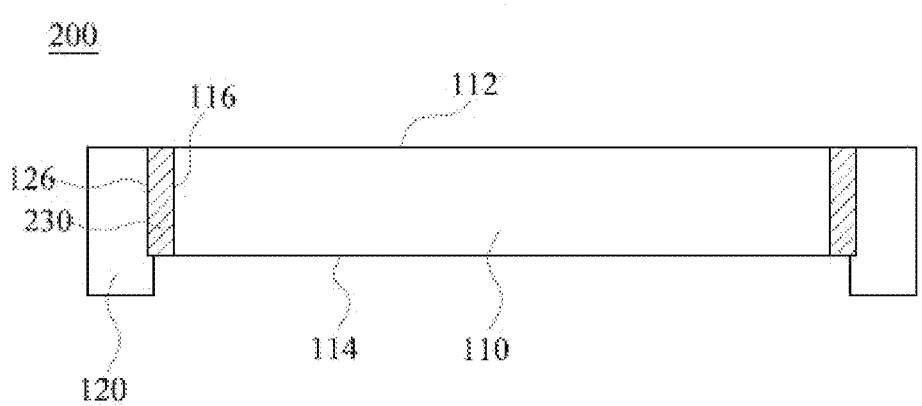
FIG. 2 illustrates a cross-sectional view of a three-dimensional cover plate according to various embodiments of the present disclosure.

FIG. 2 illustrates a cross-sectional view of a three-dimensional cover plate 200 according to various embodiments of the present disclosure. Please note that the present disclosure is not limited to bonding the upper surface 122 of the side panel 120 and the lower surface 114 of the transparent substrate 110. As shown in FIG. 2, in some embodiments, the side surface 126 of the side panel 120 is bonded to the side surface 116 of the transparent substrate 110 to form a binding layer 230 between the side surface 126 of the side panel 120 and the side surface 116 of the transparent substrate 110. The binding layer 230 includes aluminum-oxygen-silicon bonds (Al—O—Si), silicon-oxygen-silicon bonds (Si—O—Si), or aluminum-oxygen-aluminum bonds (Al—O—Al).

In some embodiments, the side surface 126 of the side panel 120 is bonded to the side surface 116 of the transparent substrate 110, and the upper surface 112 of the transparent substrate 110 is flush with the upper surface 122 of the side panel 120 to form a three-dimensional cover plate 200 with integrated seamless connection.

Although the transparent substrate 110 and the side panel 120 are bonded with an angle of 90 degrees between the lower surface 114 of the transparent substrate 110 and the side surface 126 of the side panel 120, as shown in the three-dimensional cover plate 100 and 200 in FIG. 1 and FIG. 2, no limitation is made thereto. Other embodiments, in which the composite of the transparent substrate 110 and side panel 120 is formed at an angle in a range from 0 to 180 degrees, are also contemplated herein.

Figure 3:
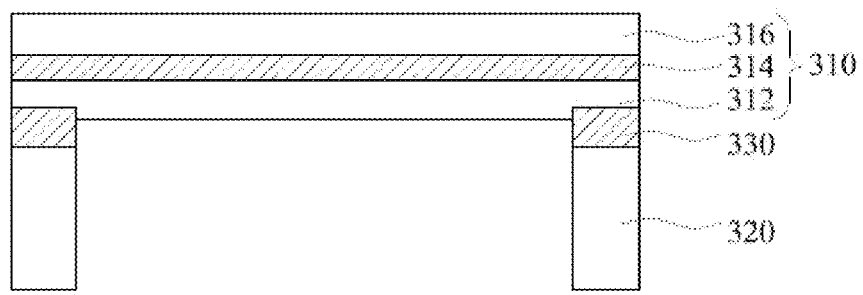
FIG. 3 illustrates a cross-sectional view of a three-dimensional cover plate according to various embodiments of the present disclosure.

FIG. 3 illustrates a cross-sectional view of a three-dimensional cover plate 300 according to various embodiments of the present disclosure. As shown in FIG. 3, the three-dimensional cover plate 300 includes a transparent composite substrate 310, which includes a glass substrate 312, a sapphire substrate 316 and a second binding layer 314. The second binding layer 314 is disposed between the glass substrate 312 and the sapphire substrate 316 to stably bond the two, and the second binding layer 314 includes aluminum-oxygen-silicon bonds (Al—O—Si). A side panel 320 is stably bonded to the glass substrate 312 by a first binding layer 330, which includes aluminum-oxygen-silicon bonds (Al—O—Si) or silicon-oxygen-silicon bonds (Si—O—Si). In some embodiments, the side panel 320 is stably bonded to the sapphire substrate 316 by the first binding layer 330, which includes aluminum-oxygen-silicon bonds (Al—O—Si) or aluminum-oxygen-aluminum bonds (Al—O—Al). The glass substrate 312 may be, for example, a substrate through chemical strengthening, which has better strength to improve the sapphire substrate 316 with thinner thickness and lower compression resistance. Preferably, the sapphire substrate 316 acts as a touching surface, and one surface of the glass substrate 312 away from the sapphire substrate 316 is combined with other touch or display devices, so as to improve the scratch resistance and the compression resistance of the three-dimensional cover plate 300.

Figure 4:
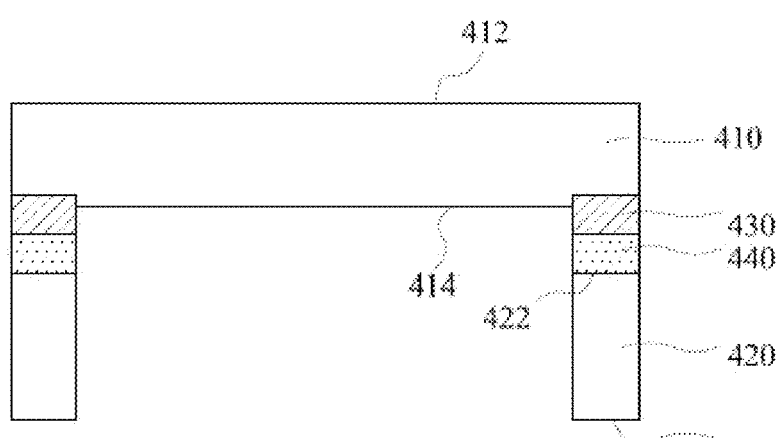
FIG. 4 illustrates a cross-sectional view of a three-dimensional cover plate according to various embodiments of the present disclosure.

FIG. 4 illustrates a cross-sectional view of a three-dimensional cover plate 400 according to various embodiments of the present disclosure. As shown in FIG. 4, the three-dimensional cover plate 400 includes a transparent substrate 410, a side panel 420, and a binding layer 430 disposed between the transparent substrate 410 and the side panel 420, so as to bond the transparent substrate 410 and the side panel 420. In addition, the three-dimensional cover plate 400 further includes an inorganic material layer 440 disposed between the binding layer 430 and the side panel 420. The inorganic material layer 410 is a silicon layer or a silicon dioxide layer to achieve higher bonding strength between the transparent substrate 410 and the side panel 420. In some embodiments, the transparent substrate 410 and the side panel 420 are independently formed of glass or sapphire. When one of the transparent substrate 410 and the side panel 420 is formed of glass, and the other is formed of sapphire, the inorganic material layer 440 is preferably formed on a surface of the sapphire plate. In addition, the transparent substrate may be the transparent composite substrate 310 shown in FIG. 3. It is worth noting that the side panel 420 is bonded to the glass substrate 312 of the transparent composite substrate 310, and the binding layer 430 includes silicon-oxygen-silicon bonds (Si—O—Si).

Figure 5:
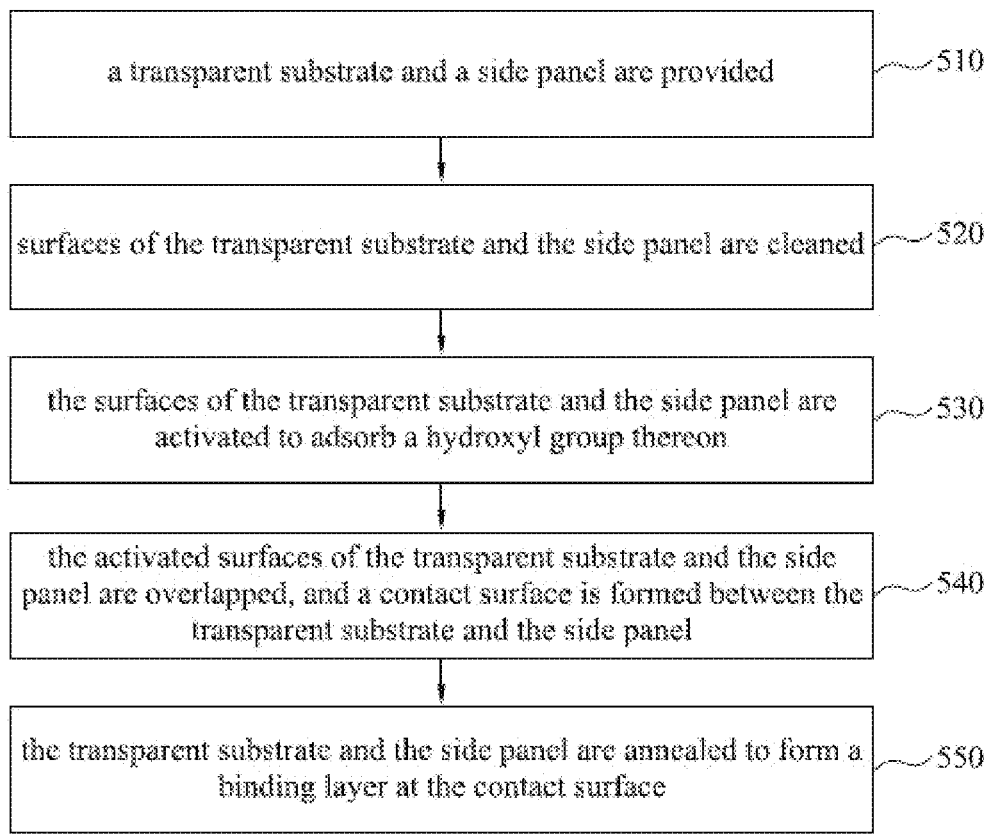
FIG. 5 is a flow chart illustrating a method of manufacturing a three-dimensional cover plate, according to various embodiments of the present disclosure.

FIG. 5 is a flow chart illustrating a method of manufacturing a three-dimensional cover plate, according to various embodiments of the present disclosure. The method can be used in accordance with manufacture of the three-dimensional cover plate 100 shown in FIG. 1, which starts with step 510, in which a transparent substrate 110 and a side panel 120 are provided.

Continuing in step 520, the surfaces of the transparent substrate 110 and the side panel 120 are cleaned. Because the cleanness of the bonding surfaces influence the bonding strength, dust and particles on the surfaces of the transparent substrate 110 and the side panel 120 are cleaned away with water, alcohol, acetone, or a combination thereof before bonding. In addition, the flatness of the bonding surfaces also influences the bonding strength. The surfaces of the transparent substrate 110 and the side panel 120 are polished before cleaning, so as to obtain flat and smooth surfaces.

Referring to step 530, the surfaces of the transparent substrate 110 and the side panel 120 are activated to adsorb a hydroxyl group thereon. A plasma gas, such as nitrogen gas, argon gas, or neon gas, generates ions or neutral atoms at high temperature and high energy, and these ions or neutral atoms physically impact the surfaces of transparent substrate 110 and the side panel 120. Therefore, the surfaces predetermined for bonding adsorb the hydroxyl groups thereon. As illustrated in FIG. 1, some unstable oxygen atoms are on the surfaces or in vivo of the transparent substrate 110 and the side panel 120. Under certain conditions, these unstable oxygen atoms are activated to leave silicon atoms and aluminum atoms, and dangling bonds are formed at the surfaces. In FIG. 1, the lower surface 114 of the transparent substrate 110 and the upper surface 122 of the side panel 120 are activated by the plasma gas to form hydrophilic lower surface 114 and hydrophilic upper surface 122. The hydrophilic lower surface 114 of the transparent substrate 110 and the hydrophilic upper surface 122 of the side panel 120 are able to adsorb hydroxyl groups, so as to form the silanol bonds (Si—OH) and the aluminum alcohol bonds (Al—OH). In some embodiments, the plasma gas is a low-temperature plasma gas. In various embodiments, the plasma gas is in a vacuum environment to increase efficiency of the process.

Continuing in step 540, the activated surfaces of the transparent substrate 110 and the side panel 120 are overlapped, and a contact surface is formed between the transparent substrate 110 and the side panel 120. Referring to FIG. 1 at the same time, the activated lower surface 114 of the transparent substrate 110 and the activated upper surface 122 of the side panel 120 are overlapped to form the contact surface between the transparent substrate 110 and the side panel 120. Because the lower surface 114 and the upper surface 122 are hydrophilic, water molecules are easily adsorbed thereon, and a hydrogen bonding bridge is formed at the contact surface to attract the lower surface 114 to the upper surface 122. The bonding strength of the hydrogen bonding bridge is stronger than a van der Waals force between atoms, so an initial bonding is much easier to be achieved.

Continuing in step 550, the transparent substrate 110 and the side panel 120 are annealed to form a binding layer 130 at the contact surface. After initial bonding, the transparent substrate 110 and the side panel 120 are heated in an atmosphere furnace to perform an annealing process. During the annealing process, the hydrogen bonds between the lower surface 114 and the upper surface 122 disappear, and oxygen bonds (—O—O— or —O—) are formed to shorten the space between the atoms at the contact surface. At the same time, the silanol bonds or the aluminum alcohol bonds at the lower surface 114 of the transparent substrate 110 are polymerized with the silanol bonds or the aluminum alcohol bonds at the upper surface 122 of the side panel 120, and the binding layer 130 having silicon-oxygen-silicon bonds, aluminum-oxygen-silicon bonds or aluminum-oxygen-aluminum bonds is formed at the contact surface to achieve a stable composite of the transparent substrate 110 and the side panel 120.

It is worth noting that, the flow chart shown in FIG. 5 is not limited to manufacture of the three-dimensional cover plates 100, 200, 300 shown in FIG. 1 to FIG. 3, but could be also used to manufacture the three-dimensional cover plate shown in FIG. 4. For example, the inorganic material layer 440 is coated on the upper surface 422 of the side panel 420, and steps of cleaning, activating, stacking and annealing are performed to form the binding layer 430 between the transparent substrate 410 and the side panel 420. The transparent substrate 410 is preferably formed of glass. In some embodiments, the binding layer 430 includes silicon-oxygen-silicon bonds (Si—O—Si) to achieve a stable composite of the transparent substrate 410 and the side panel 420 though the inorganic material layer 440.

Figure 6:
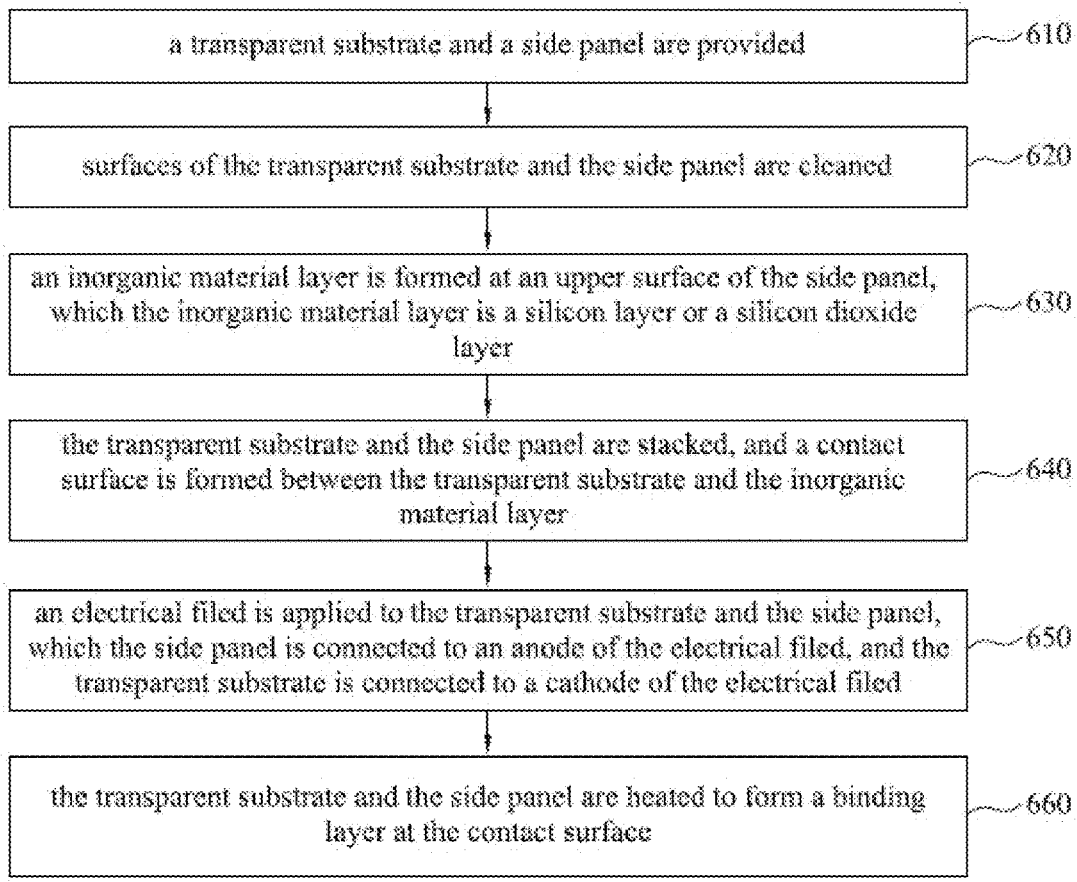
FIG. 6 is a flow chart illustrating a method of manufacturing a three-dimensional cover plate, according to various embodiments of the present disclosure.

FIG. 6 is a flow chart illustrating a method of manufacturing a three-dimensional cover plate, according to various embodiments of the present disclosure. The method starts with step 610, in which a transparent substrate 410 and a side panel 420 are provided to manufacture the three-dimensional cover plate 400 shown in FIG. 4.

Continuing in step 620, the surfaces of the transparent substrate 410 and the side panel 420 are cleaned. Because the cleanness of the bonding surfaces will influence the bonding strength, dust and particles on the surfaces of the transparent substrate 410 and the side panel 420 are cleaned with water, alcohol, acetone, or combination thereof before bonding. In addition, the flatness of the bonding surfaces also influences the bonding strength. The surfaces of the transparent substrate 410 and the side panel 420 are polished before cleaning, so as to obtain flat and smooth surfaces.

Referring to step 630, an inorganic material layer 440 is formed at the upper surface 422 of the side panel 420. The inorganic material layer 440 is a silicon layer or a silicon dioxide layer. As shown in FIG. 4, the inorganic material layer 440 is formed on the upper surface 422 of the side panel 420 and in contact with the side panel 420. In some embodiments, the inorganic material layer 440 is formed by coating. In some embodiments, the inorganic material layer 440 is a silicon layer or a silicon dioxide layer having a thickness in a range from about 1 μm to about 10 μm.

Continuing in step 640, the transparent substrate 410 and the side panel 420 are stacked, and a contact surface is formed between the transparent substrate 410 and the side panel 420. Referring to FIG. 4 at the same time, the transparent substrate 410 is stacked with the side panel 420 having the inorganic material layer 440 on the upper surface 422 to form the contact surface between the inorganic material layer 440 and the transparent substrate 110.

Continuing in step 650, an electrical field is applied to the transparent substrate 410 and the side panel 420. The side panel 420 is connected to an anode of the electrical field, and the transparent substrate 410 is connected to an cathode of the electrical field. After stacking, the transparent substrate 410 and the side panel 420 are placed in a bonding machine for bonding. The bonding machine generates the electrical field applied to the transparent substrate 410 and the side panel 420. The lower surface 424 of the side panel 420 is connected to the anode of the electrical field, and the upper surface 412 of the transparent substrate 410 is connected to the cathode of the electrical field. While applying the electrical field, a huge current pulse is generated. When the current pulse is gradually decreased to zero, the bonding process is completed. In some embodiments, the electrical field has a voltage in a range from about 300 V to about 800 V, preferably 360V.

In some embodiments, the electrical field is applied to cause ions in the transparent substrate 410 to migrate, so that the transparent substrate 410 is formed of glass. In addition, the transparent substrate 410 may be the transparent composite substrate 310 shown in FIG. 3, and the side panel 420 is bonded to the glass substrate 312 of the transparent composite substrate 310.

The alkali metal ions in the transparent substrate 410, such as sodium, potassium and calcium ions, migrate toward the cathode and aggregate at the upper surface 412 of the transparent substrate 410. Therefore, a depletion region having negative charges is formed at the upper surface 412 of the transparent substrate 410 adjacent to the inorganic material layer 440. A huge electrostatic attraction force is formed between the depletion region and the inorganic material layer 440 having positive charges to make the transparent substrate 410 bond stably to the side panel 420.

Continuing in step 660, the transparent substrate 410 and the side panel 420 are heated to form the binding layer 430 at the contact surface. The bonding process is performed at high temperature, about 200° C. to 400° C., to assist the electrostatic attraction force, and the bonding strength is further increased. In addition, oxygen ions remain at the lower surface 414 of the transparent substrate 410 due to the migration of the alkali metal ions. These oxygen ions react with silicon inside the inorganic material layer 440 at high temperature to form stable silicon-oxygen-silicon bonds (Si—O—Si) in the binding layer 430 to achieve a stable composite of the transparent substrate 410 and the side panel 420.

Figure 7:
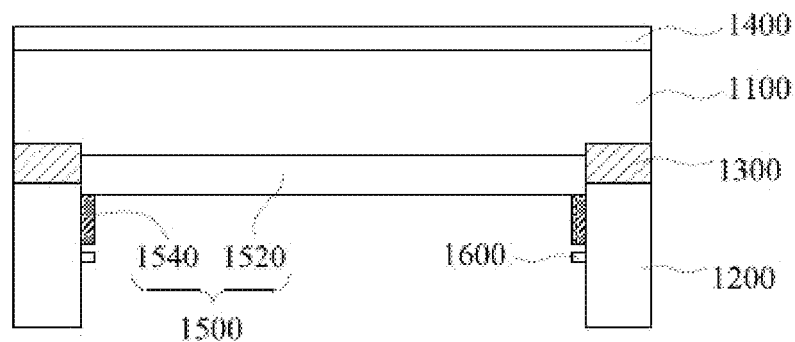
FIG. 7 is a cross-sectional view of a touch panel according to various embodiments of the present disclosure.

The three-dimensional cover plate in the present disclosure can act as a cover plate of the touch panel. Refer to FIG. 7 to further clarify the present disclosure. FIG. 7 illustrates a cross-sectional view of a touch panel 1000 according to various embodiments of the present disclosure. As shown in FIG. 7, the touch panel 1000 includes a transparent substrate 1100 and a side panel 1200 at a lower surface of the transparent substrate 1100. A first binding layer 1300 is disposed between the transparent substrate 1100 and the side panel 1200 to bond the two with a bond therebetween. In some embodiments, the positional relationship between the transparent substrate 1100 and the side panel 1200 is similar to the configuration shown in FIG. 1, but not limited thereto. In various embodiments, the side panel 1200 is at a side surface of the transparent substrate 1100, which is similar to the configuration shown in FIG. 2, and the two are bonded through the first binding layer 1300.

To increase transmittance of the touch panel 1000, an anti-reflective film 1400 is disposed on an upper surface the transparent substrate 1100. The anti-reflective film 1400 may be a single-layer or multi-layer transparent film having anti-reflective or anti-glare functionality. On the other hand, a touch sensing device 1500 is disposed below the lower surface of the transparent substrate 1100. The touch sensing device 1500 and the anti-reflective film 1400 are respectively at two opposite sides of the transparent substrate 1100.

The touch sensing device 1500 includes a sensing electrode layer 1520 and a wire layer 1540. The sensing electrode layer 1520 is a sensing electrode directly formed at the lower surface of the transparent substrate 1100. In some embodiments, the sensing electrode layer 1520 is a sensing electrode film or a sensing electrode substrate adhered to the lower surface of the transparent substrate 1100. In some embodiments, the wire layer 1540 is disposed at the side surface of the side panel 1200 adjacent to the lower surface of the transparent substrate 1100, and the sensing electrode layer 1520 is the sensing electrode film electrically connecting to the wire layer 1540. The sensing electrode layer 1520 is formed of transparent conductive material, such as indium tin oxide (ITO), indium zinc oxide (IZO), cadmium tin oxide (CTO), aluminum zinc oxide (AZO), indium tin zinc oxide (ITZO), graphene, Ag nanowire, or carbon nanotubes (CNT), but not limited thereto. The wire layer 1540 is formed of transparent conductive material the same as the sensing electrode layer 1520, or opaque conductive material, such as Ag, Cu, Mo, Al, or other suitable metals or alloys. The sensing electrode layer 1520 and the wire layer 1540 are formed by printing and laser etching, or sputtering and photolithography etching. The sensing electrode layer 1520 generates signals when sensing touching, and the wire layer 1540 transfers the signals to a processor to calculate the location of touching.

In various embodiments, a plurality of touch functional devices 1600 are also disposed at the side surface of the side panel 1200 adjacent to the lower surface of the transparent substrate 1100, and these touch functional devices 1600 are electrically connected to the wire layer 1540. These touch functional devices 1600 have functionality of adjusting volume, photographing, and powering on/off, but not limited thereto.

In various embodiments, the transparent substrate 110 is a transparent composite substrate including a sapphire substrate, a glass substrate and a second binding layer to bond the sapphire substrate and the glass substrate with a bond therebetween. It is worth noting that the sapphire substrate acts as a touching surface to make the touch panel 1000 have the scratch resistance of the sapphire substrate and the strength of the glass substrate. Specifically, users operate programs and give instructions by touching patterns shown on the sapphire substrate. In some embodiments, the sapphire is directly bonded to the glass substrate to form the second binding layer having silicon-oxygen-aluminum bonds at a contact surface. In various embodiments, the inorganic material layer is coated on the sapphire substrate, and then the sapphire substrate is bonded to the glass substrate to form the second binding layer having silicon-oxygen-silicon bonds between the glass substrate and the inorganic material layer.

The transparent substrate and the side panel in above embodiments and figures are illustrated by a planar substrate, but not limited thereto. The transparent substrate and the side panel may be 2.5D or 3D substrate, which means that the upper surface of the transparent substrate or a surface combined by the upper surface and the side surface may be a curve surface. In addition, the side surface of the side panel or a surface combined by the side surface and the lower surface may be a curve surface.

The embodiments of the present disclosure discussed above have advantages over existing structures and methods, and the advantages are summarized below. The touch panel using the three-dimensional cover plate increases diversification of the touch mode. Users could not only use the common planar touch panel, but also perform touch operation at the sides of the touch panel. In addition, the three-dimensional cover plate has advantages of high dimensional accuracy and flat surface, and pitting particles are not formed during the manufacturing, so as to form the three-dimensional cover plate with integrated seamless connection. Therefore, it is not necessary to remove these pitting particles in excessive subsequent process. Furthermore, the temperature of the process is much lower to decrease risk, and the process also reduces costs to achieve the target of mass production. Most importantly, the three-dimensional cover plate of the present disclosure has high bonding strength to maintain stable and solid bonding at high temperature and pressure, and thereby being widely applied to the touch device.

Although the present invention has been described in considerable detail with reference to certain embodiments thereof, other embodiments are possible. Therefore, the spirit and scope of the appended claims should not be limited to the description of the embodiments contained herein. Reference will now be made in detail to the embodiments of the invention, examples of which are illustrated in the accompanying drawings. Wherever possible, the same reference numbers are used in the drawings and the description to refer to the same or like parts.

What is claimed is:

1. A three-dimensional structure, comprising:
   a transparent substrate, having a hydrophilic surface, comprising:
      a sapphire substrate;
      a glass substrate disposed below the sapphire substrate; and
      a second binding layer bonding the sapphire substrate and the glass substrate;
   a side panel bonding to only a part of the glass substrate of the transparent substrate;
   a first binding layer disposed between the hydrophilic surface of the transparent substrate and the side panel to bond the transparent substrate and the side panel; and
   an inorganic material layer disposed between the first binding layer and the side panel, wherein:
      the inorganic material layer comprises either a silicon layer or a silicon dioxide layer,
      the first binding layer comprises silicon-oxygen-silicon bonds formed from silicon in of the glass substrate, oxygen ions at a lower surface of the glass substrate, and silicon inside the inorganic material layer, and
      the second binding layer comprises aluminum-oxygen-silicon bonds formed from aluminum in the sapphire substrate and silicon in the glass substrate.

2. The three-dimensional structure of claim 1, wherein:
   the transparent substrate has a side surface adjacent to the lower surface of the glass substrate,
   the side panel has a side surface adjacent to an upper surface of the side panel facing the transparent substrate, and
   the side surface of the side panel is co-planar with the side surface of the transparent substrate.

3. A touch panel, comprising:
   a three-dimensional structure, comprising:
      a transparent substrate, having a hydrophilic surface, comprising:
         a sapphire substrate;
         a glass substrate disposed below the sapphire substrate; and
         a second binding layer bonding the sapphire substrate and the glass substrate;
      a side panel bonding to only a part of the glass substrate of the transparent substrate;
      a first binding layer disposed between the hydrophilic surface of the transparent substrate and the side panel to bond the transparent substrate and the side panel;
      an inorganic material layer disposed between the first binding layer and the side panel, wherein:
         the inorganic material layer comprises either a silicon layer or a silicon dioxide layer,
         the first binding layer comprises silicon-oxygen-silicon bonds formed from silicon in the glass substrate, oxygen ions at a lower surface of the glass substrate, and silicon inside the inorganic material layer, and
         the second binding layer comprises aluminum-oxygen-silicon bonds formed from aluminum in the sapphire substrate and silicon in the glass substrate.

4. The touch panel of claim 3, wherein the side panel comprises a hydrophilic surface facing the transparent substrate.

5. The three-dimensional structure of claim 1, wherein the first binding layer is in contact with a sidewall and a bottom surface of the transparent substrate.

6. The three-dimensional structure of claim 1, further comprising:
   a sensing electrode layer disposed at a lower surface of the transparent substrate; and
   a wire layer disposed at a side surface of the side panel adjacent to the lower surface of the transparent substrate, wherein the wire layer is electrically connected to the sensing electrode layer.

7. The three-dimensional structure of claim 6, further comprising a touch functional device disposed at the side surface of the side panel, wherein the wire layer is disposed between the touch functional device and the sensing electrode layer.

8. The touch panel of claim 3, wherein:
the transparent substrate has a side surface adjacent to the lower surface of the glass substrate,
the side panel has a side surface adjacent to an upper surface of the side panel facing the transparent substrate, and
the side surface of the side panel is co-planar with the side surface of the transparent substrate.

9. The touch panel of claim 3, further comprising:
a sensing electrode layer disposed at a lower surface of the transparent substrate; and
a wire layer disposed at a side surface of the side panel adjacent to the lower surface of the transparent substrate, wherein the wire layer is electrically connected to the sensing electrode layer.

10. The touch panel of claim 9, further comprising a touch functional device disposed at the side surface of the side panel, wherein the wire layer is disposed between the touch functional device and the sensing electrode layer.

11. The touch panel of claim 3, wherein the first binding layer is in contact with a sidewall and a bottom surface of the transparent substrate.

\* \* \* \* \*